C. C. KLEIN.
Device for Fastening Wheels to Shafts.
No. 221,466.  Patented Nov. 11, 1879.
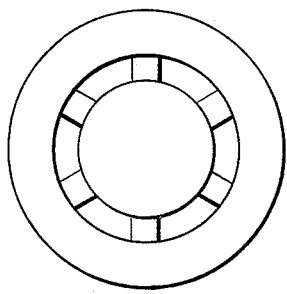
Fig. 1.
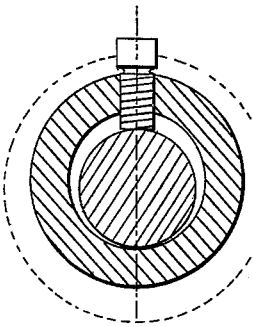
Fig. 2.
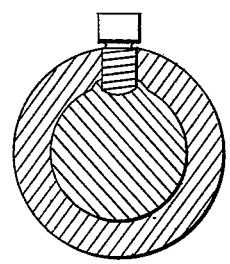
Fig. 3.
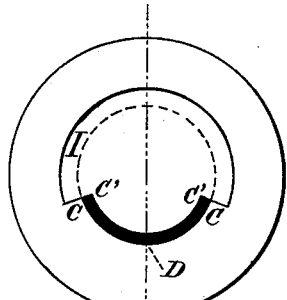
Fig. 4.
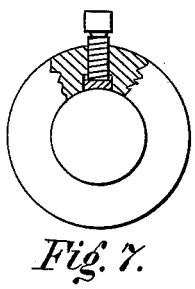
Fig. 7.
Fig. 5.
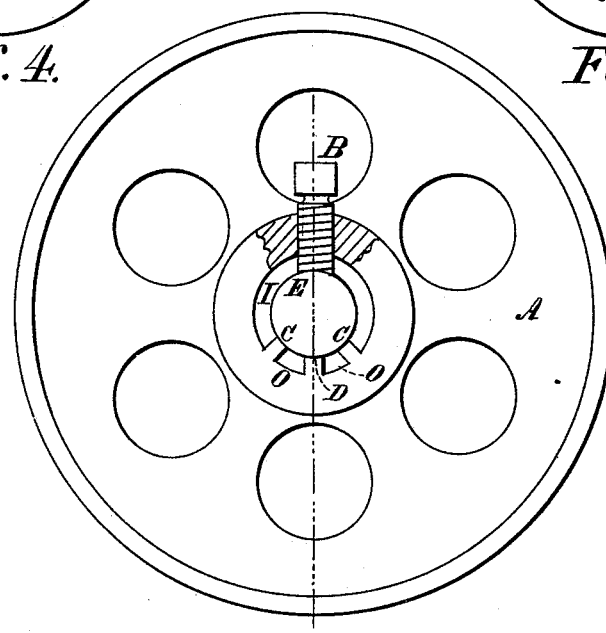
Fig. 6.
Witnesses,
Inventor,
Chas. C. Klein.

UNITED STATES PATENT OFFICE.

CHARLES C. KLEIN, OF PHILADELPHIA, PENNSYLVANIA.

IMPROVEMENT IN DEVICES FOR FASTENING WHEELS TO SHAFTS.

Specification forming part of Letters Patent No. 221,466, dated November 11, 1879; application filed August 12, 1879.

*To all whom it may concern:*

Be it known that I, CHAS. C. KLEIN, of Philadelphia, county of Philadelphia and State of Pennsylvania, have invented certain new and useful Improvements in Fastening Wheels to Shafts, which improvements are fully set forth in the following specification, reference being had to the accompanying drawings, in which—

Figure 1 shows the hub of a wheel fixed upon a shaft by a primitive method termed technically "staking up." Figs. 2, 3, and 7 indicate the objectionable results of the present method of fastening. Figs. 4 and 5 are intended to illustrate by contrast how a saving in finishing the "bore" is to be effected by diminishing the amount of metal to be removed in the process of finishing, and by distributing this metal in such a way that it shall give way easily before the cutting-tools. Fig. 6 shows a wheel and shaft embodying the improvement of fixing wheels to shafts.

By the term wheels I mean all continuous levers for the transmission of power from an axis to a point or device exterior of that axis, such as pulleys or belt-wheels, spurs, bevels, rope-wheels, &c.

Previous to the introduction of modern machine-tools it was the practice to form the holes in wheels which were to receive the shafts large enough in the rough casting to leave sufficient room around the shaft to admit wedges or keys, as in Fig. 1, which were driven in until the outer periphery of the wheel was found to be true or concentric with the shaft. While this practice saved the expense of boring, it, in turn, entailed a great amount of labor in "staking up" a wheel.

The modern practice is to bore the wheels to correspond to the diameter of the shaft, to fasten them with one or more set-screws, as in Figs. 2 and 3, or to key them upon the shaft, and this practice is the result of the introduction of modern machine-tools.

In boring wheels to suit certain diameters of shafts, mathematical accuracy, or even tight fits, are impracticable, as the surfaces of wheels and shafts which come in contact very often become bruised and injured in handling and shipping; hence the wheels are usually bored large enough to enter upon a shaft easily, or in other words, the bore of the wheel is made appreciably larger than the shaft. This gives rise to the difficulty shown in an exaggerated form in Fig. 2, namely, the fastening device draws the metal of the hub away from the shaft and presses it against the shaft at a point diametrically opposite, so that, practically, the wheel is supported upon the shaft by only two points diametrically opposite to each other, and moreover a concentric wheel is, by this mode of fastening, thrown into an eccentric position with the shaft, proportionate to the difference between the bore of the wheel and the diameter of the shaft. This manifestly disadvantageous way of fixing wheels to shafts requires, in many cases, an enormous pressure to hold the wheel firmly upon the shaft; but another and more serious trouble is often encountered when wheels are fastened by set-screws, which latter have to be screwed down so tightly that they embed themselves in the shafts, and the metal of the latter thereby displaced is forced up around the screw in the form of a protuberance, as indicated in Fig. 3. This protuberance or "burr," as it is technically termed, is often forced into the metal of the hub, and when this has taken place the wheel can be removed from the shaft only with the greatest difficulty, and is often broken in removing it. Difficulty of removal is also produced in wheels fastened in this manner by exposure to dampness or corroding vapors, which produce a layer of oxide between the surfaces of the shaft and hub, which acts as a cement between the wheel and the shaft, and holds the two so firmly together that an attempt to separate them results in injury to both.

It is often desirable and necessary to fix pulleys or other wheels to shafts near the middle of their length, and to form such shafts, for various purposes, with "swells" or places of somewhat larger diameter at the ends; and, as a wheel which is bored to the normal size of the shaft cannot be pushed over these enlarged places, such wheels are usually split diametrically, and are put on the shaft in halves, a process which increases their cost considerably.

The objects of my invention are to do away with the objectionable features of the present mode of fixing wheels to shafts, mentioned heretofore, and at the same time to reduce the cost of wheels.

The first object of my invention is to hold wheels more firmly on the shaft than is possible by the present mode, and this is accomplished by supporting the wheel in more than two points.

Instead of making the bore of wheels slightly larger than the shaft, as is the present custom, I provide the wheel A opposite to the fastening device B with an arch, C C, of a slightly-less radius than that of the shaft, so that the shaft bears harder upon the extremities C C of the arc than it does upon the central part, D, and therefore the shaft has virtually three supporting-points, C C, and the fastening device B, which latter may be either a screw or key.

In order to finish the periphery of wheels of this construction, I fasten them upon a mandrel of precisely the same diameter as the shaft upon which they are to fit, and turn them concentric with that mandrel in a lathe, so that when they are put in place upon the shaft the center of the wheel and that of the shaft will coincide.

The second object of my invention is to prevent the protuberances or burrs formed upon the shaft by the fastening device B from embedding themselves into the inner surface of the hub, which I accomplish by providing a space, I, near the fastening device B, between the periphery of the shaft and the inner surface of the hub, which space permits the rising of said burrs from the shaft without their entering the metal of the hub, and causing thereby the trouble indicated in Fig. 3. The space I may be provided in several ways, depending upon the circumstances under which the improvement is to be used. If it is to be used upon a wheel which is not to be provided with the other improvements described in this specification, the wheel may be bored so much larger than the shaft that the difference between the bore of the wheel and the diameter of the shaft will leave this space; but in that case, and in order to insure concentricity of the outer periphery of the wheel and the shaft, I bore the wheel eccentrically—in other words, the distance from the center of the wheel to the center of its bore is equal to the difference between the bore and the diameter of the shaft, as indicated in Fig. 2 by dotted circle, which represents the outer periphery of the wheel, and which is concentric with the shaft.

Although I prefer that the space I should extend, at the least, around the entire semi-periphery of the shaft E, upon which the screw B acts in old wheels to which the improvement is to be applied, it would entail considerable labor to cut away so large an amount of metal, and therefore I simply cut a slot parallel with the axis of the wheel, and wide enough to give sufficient space on each side of the fastening device, to answer the intended purpose.

One of the devices now in use to prevent the difficulties caused by burring of the shaft is represented in Fig. 7, where a slot or keyway similar to the one just described is cut directly under the fastening-screw, into which a gib is fitted, whose inner surface corresponds to the periphery of the shaft; but the expense of the gib and the care required in fitting it prevent its general use, and practically it will not hold a wheel as firmly as a set-screw will, which embeds itself directly into the shaft.

In order to prevent a wheel fastened by this device from slipping, a keyway has to be planed into the shaft in many cases, and instead of the concave surface of the gib bearing upon the periphery of the shaft a feather or key is used, and pressed into the keyway by the screw. This, of course, is expensive work, as it involves planing an accurate keyway into shaft, a similar one into the wheel, and providing a key and fitting the same.

In my invention the slot or space I, not being for the purpose of inserting therein a gib or key, is not limited to any exact size, and can therefore be cut very rapidly and by inferior workmen, and in new wheels can be formed in the core without any further labor thereon.

While the extension of the space I to a slight extent in the immediate vicinity of the fastening device B will effectually prevent the burrs formed by the fastening device B from embedding themselves into the hub of the wheel A, the elongation of the space I to or even beyond the limits of a semicircle will permit the use of old, worn, and bruised shafts, which, with the present mode of fastening wheels, would have to be re-turned, in order to receive wheels which have been bored closely to the diameter of the shaft.

It is usually an easy matter to find upon such old and irregular shafts true spots large enough to accommodate the arch C C in the hub of the wheel A, Fig. 6, and the irregularities find room in the space I. In like manner shafts with enlargements upon their ends can be passed through wheels which have the space I extended to or beyond a semicircle.

In making wheels by the present method it is the custom to core the central hole in the wheel from one-eighth to half an inch smaller than the diameter of the shaft and to remove this superfluous metal by boring.

The annular segment C' C', indicated in solid black in Fig. 4, represents the amount of metal to be removed in finishing the bore of the improved wheel. If it is attempted to remove this annular segment by boring it is evident that as much time would be consumed as there would be in boring out the entire circumference. Therefore I remove the metal by a tool having a reciprocating motion parallel with the axis of the wheel; and in order to limit the number of the strokes which this tool would have to make during the process of finishing the arch C C, I remove the greater part of the metal by providing the rough casting with grooves O O O O, Figs. 5 and 6, so that only the points C' C' C' remain to be removed.

What I claim as my invention, and desire to secure by Letters Patent, is—

1. The hub of the wheel A, provided in its interior with projections C C, whose inner ends form an arch for the support of the shaft, and with grooves O O between them, in combination with the shaft E and fastening device B, substantially as and for the purpose specified.

2. The hub of the wheel A, having the space I between the hub and shaft, and adjacent to the fastening device, and the arched surface C C opposed to the fastening device, in combination with the shaft E and fastening device B, substantially as and for the purpose specified.

CHAS. C. KLEIN.

Witnesses:
   CHAS. E. PANCOAST,
   H. M. COLLINS, Jr.